United States Patent [19]

Kasper et al.

[11] Patent Number: 4,953,319
[45] Date of Patent: Sep. 4, 1990

[54] MULTI-ATTRACTANT FISH BAIT

[76] Inventors: John M. Kasper, 11606 Timber Ridge La., Apt. 3, Sharonville, Ohio 45241; Maurice K. Perley, Jr., 1042 Royalton Rd., Orlando, Fla. 32825; Bradley T. Gullett, 1590 Druid Rd., Maitland, Fla. 32751

[21] Appl. No.: 385,218

[22] Filed: Jul. 25, 1989

Related U.S. Application Data

[63] Continuation-in-part of Ser. No. 274,001, Nov. 21, 1988.

[51] Int. Cl.⁵ .............................................. A01K 85/00
[52] U.S. Cl. .................................... 43/42.06; 43/42.24
[58] Field of Search .................. 43/42.24, 17.6, 42.31, 43/42.06

[56] References Cited

U.S. PATENT DOCUMENTS

| | | | |
|---|---|---|---|
| 4,138,792 | 2/1979 | Hill | 43/42.24 |
| 4,203,246 | 5/1980 | Sacharnoski, Sr. | 43/42.24 |
| 4,589,221 | 5/1986 | Mattison | 43/42.24 |
| 4,787,167 | 11/1988 | Wroclawski | 43/17.6 |
| 4,879,831 | 11/1989 | Herrlich | 43/42.06 |
| 4,887,376 | 12/1989 | Sibley et al. | 43/42.24 |

Primary Examiner—Richard K. Seidel
Assistant Examiner—Rex E. Pelto
Attorney, Agent, or Firm—Clifton Ted Hunt

[57] ABSTRACT

This artificial fish bait embodies five attractants in a body with a dynamic tail to lure the fish. The attractants embodied in the bait are noise, light, taste, smell, and color. The effectiveness of each attractant is enhanced by undulating movement of the tail through the water.

19 Claims, 1 Drawing Sheet

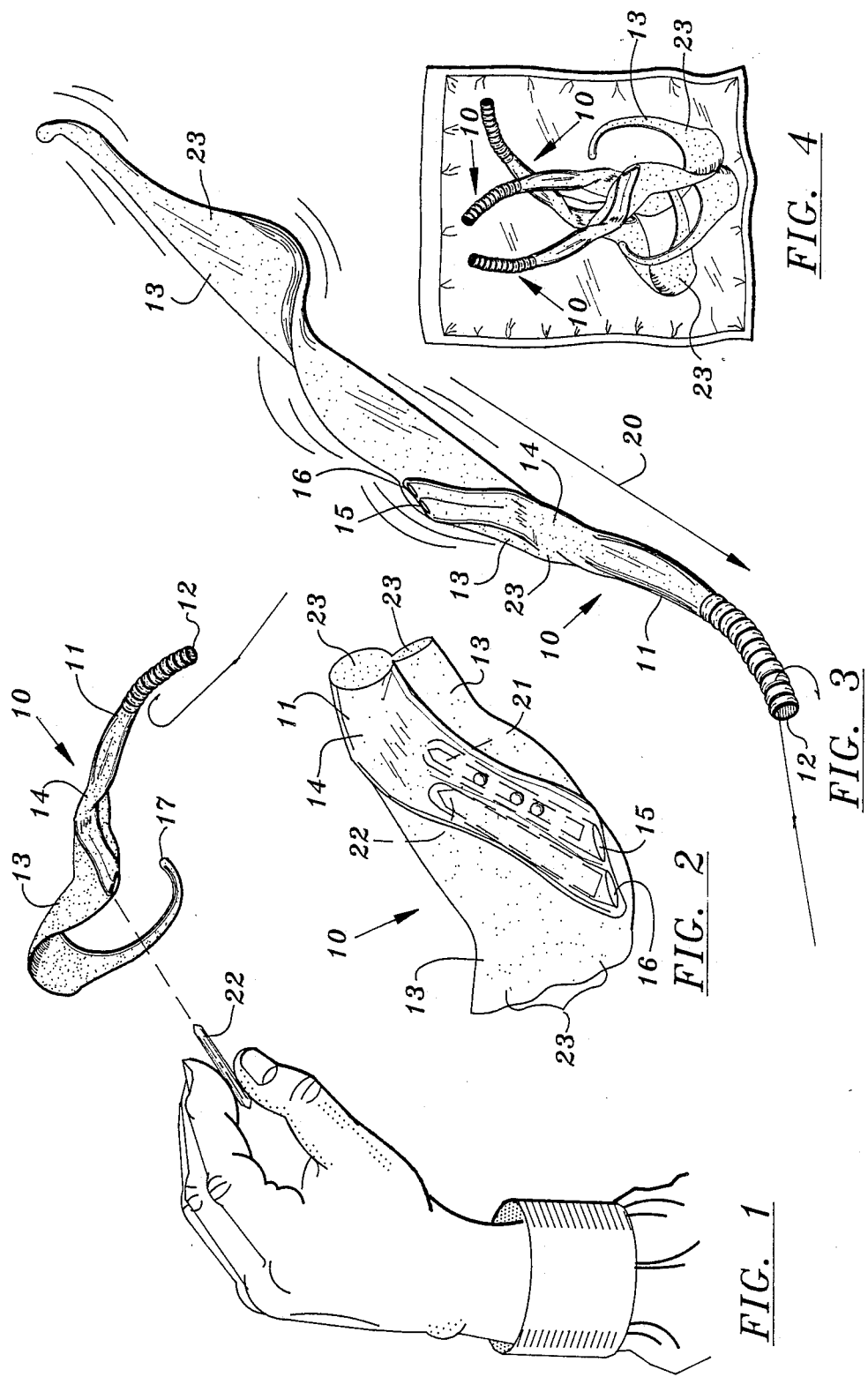

MULTI-ATTRACTANT FISH BAIT

CROSS-REFERENCE TO RELATED APPLICATIONS

This application is a continuation-in-part of our earlier application, Ser. No. 274,001, filed Nov. 21, 1988 for CHEMILUMINESCENT FISHBAIT.

FIELD OF THE INVENTION

This invention relates to artificial fish bait, and more particularly to an artificial fish bait that embodies five fish attractants and a uniquely undulating tail.

BACKGROUND OF THE INVENTION

It is known that taste, scent, color, motion, noise, and light are attractants for fish. It is also known that the chances of catching fish are increased by equipping artificial fish lures with one or more of the five attractants. See, for example, the following patents:

| U.S. PAT. NO. | ISSUE DATE | INVENTOR | TITLE |
| --- | --- | --- | --- |
| 272,317 | Feb 13, 1883 | Pflueger | ARTIFICIAL FISH BAIT (light) |
| 2,465,127 | Mar 22, 1949 | Stark | DEVICE FOR ATTRACTING FISH (scent) |
| 3,141,255 | July 21, 1964 | Randall | FISH LURE (motion) |
| 4,267,658 | May 19, 1981 | Brown | FISHING LURE SIMULATING FISH BAIT (taste and scent) |
| 4,202,127 | May 13, 1980 | Marek | NOISE MAKING LURE (noise) |
| 4,437,256 | Mar 20, 1984 | Kulak | UNIVERSAL FLOAT LURE (light and sparkling motion) |
| 4,742,638 | May 10, 1988 | Vobejda | ARTIFICIAL FISHING LURE (metered scent) |

In addition, U.S. Pat. No. 2,983,065 issued May 9, 1961 to Ferguson for FISHING LURE discloses a lure equipped with means for releasably attaching different fish-attractant accessories. A fisherman is thereby enabled to replace one fish attractant with another type of fish attractant without having to buy, store, and use a separate lure equipped with the desired fish attractant to replace the one in use.

However, the prior art does not disclose, to applicants' knowledge, an artificial fish bait possessing attractants to appeal to all five senses of the fish.

SUMMARY OF THE INVENTION

The multi-attractant fish bait of this invention has a body and tail molded from flexible, transparent plastic. The lures are colored with granules or flecks of opaque material embedded beneath the transparent surface of the lure. A choice of colors is provided by making each lure a selected color. Lures of different colors are packaged together to give the fisherman a choice of color while fishing.

A salty tasting fish oil is also added to the plastic formulation before molding. The fish oil imparts an attractive taste and scent to the finished bait. A noise producing rattle and a chemiluminescent light stick releasably fit in pockets at the juncture of the body and tail. The tail has a life-like undulating motion that is an attractant in itself and enhances the effectiveness of the other attractants as the bait is drawn through the water.

BRIEF DESCRIPTION OF THE DRAWINGS

FIG. 1 is a perspective view of the artificial fish bait positioned for attachment to a fish hook and illustrating the insertion of a light stick or rattle in one of the pockets in the bait;

FIG. 2 is an enlarged fragmentary perspective view of the juncture of the body and tail, with parts broken away, illustrating the colored granules beneath the surface of the transparent bait and showing the pockets filled with a light stick and a rattle;

FIG. 3 is a perspective view of the fish bait being pulled through water and illustrating the dynamic motion of the tail; and FIG. 4 is a perspective view illustrating the packaging of the lures.

DETAILED DESCRIPTION OF THE INVENTION

The artificial fish bait or lure of this invention is generally indicated by the reference numeral 10. The lure 10 is flexible and is made from a plastic formulation well known to those skilled in the art of making artificial worms and the like. The structure of the lure 10 provides dynamic, life-like, undulating motion to the tail, which is a compelling attraction for fish as the lure is pulled through the water, as by trolling or casting and reeling. The lure also embodies the additional attractants of noise, light, color, taste, and smell. The several attractants are described as follows:

MOTION

The lure 10 comprises a flexible body 11 of generally circular cross-sectional configuration at its leading end 12. A long, thin, curved tail 13 is formed around the trailing end 14 of the body 11. Pockets 15 and 16 are provided in a portion of the tail 13 adjoining the trailing end 14, which is at the juncture of the body 11 and tail 13, as seen in FIG. 2.

The tip 17 of the curved tail 13 is near the trailing end 14 of the body when the lure is in the relaxed or "at rest" condition of FIG. 1. Water pressure straightens the tail 13 to the elongated position of FIG. 3 and causes the tail to vigorously undulate relative to the body when the lure is drawn through the water, as by trolling, in the direction of the arrow 20 in FIG. 3.

The undulations of the tail 13 impart corresponding motion to the contents of the pockets 15 and 16, which are filled with stiff capsules 21 and 22. The relatively bulky trailing end 14, extending at an angle to the axis of the body 11, stabilizes the body 11 while effectively serving as a hinge for the free swinging tail 13.

NOISE

The capsule 21 is part of a thin walled rattle containing several steel balls B removably positioned in the pocket 15. The balls produce noise as they are repeatedly thrown against each other during undulations of the tail. One advantage of the thin walled capsule 21 being in the portion of the relatively thin tail adjoining the trailing end 14 of the body is that the tail surrounds the trailing end 14 and causes the noise making capsule 21 to swing violently to and fro with the undulations of the tail. This produces more noise than if the noise maker were in the relatively stable body, as in the prior art.

Another advantage of locating the noise making capsule 21 in the portion of the tail adjoining the trailing end 14 of the body is that the thin walls of the pocket in the tail do not insulate the sound as much as would the thicker body 11.

LIGHT

The capsule 22 is a chemiluminescent light stick. It is activated and inserted in the pocket 16 by the fisherman just prior to fishing. The soft plastic from which the lure is made fits snugly about the noise making capsule 21 and the light stick capsule 22 and restrict them from falling out of the pockets, but the capsules are replaceable, if lost, without replacing the lure. The open ends of the pockets 15, 16 are exaggerated in FIG. 2 for the purpose of illustration, but the pockets are self-closing in actual practice.

The location of the light stick capsule 22 in the relatively thin tail 13 adjoining the trailing end 14 of the body is advantageous in that the thinness of the pocket wall coupled with its transparency produces more light than would be possible if the light were located in an opaque body portion, as is customary in the prior art. The undulating movement of the light with the tail enhances its attraction of fish.

COLOR

The lures are colored by mixing granules or flecks of opaque material, indicated by the dots 23, with the transparent plastic formulation before molding. The color of all the granules within a lure may be the same or the granules may be of different colors within the same lure.

An advantage of having granules of the same color within a lure is that different colors of granules can be put in different lures, and lures of different colors can be packaged together to give the fisherman a choice of color, depending on conditions at the time of fishing. The color from one lure will not "bleed" onto another lure within the same package, as in the prior art, because the surfaces of the lures are not colored, but transparent.

SMELL

A fish oil, such as refined mackeral oil, is mixed with the plastic formulation from which the bait is molded. The resulting scent masks the human scent and is attractive to the fish as the bait 10 is drawn through the water.

TASTE

The fish oil is combined with any desired salty-tasting substance before being mixed with the plastic formulation. This imparts an attractive taste to the bait, which is emitted as the bait is drawn through the water.

The turbulence created by the vigorous undulations of the tail as the bait 10 is drawn through the water effectively distributes the smell and the taste in a wide area of water surrounding the bait and enhances the effectiveness of these attractants.

SUMMARY

There is thus provided a lure which embodies all of the attractants heretofore used individually to attract fish, and the effectiveness of the noise, light, color, scent, and taste are all enhanced by the unique structure of the lure with its flowing tail undulating in use from the bulky trailing end of the body, with its capsules providing noise and light.

I claim:

1. An artificial fish bait comprising a soft and bulky body having a leading end and a trailing end and being of generally uniform cross-sectional dimension, the improvement which comprises a thin flat tail extending from the trailing end of the bulky body, and at least one thin walled pocket to receive fish attractant located at a junction of the thin flat tail and the trailing end of the bulky body, whereby the thin flat tail flutters in use relative to the body and imparts corresponding movement to the pocket and its contents relative to the body to enhance the effectiveness of the fish attractant.

2. An artificial fish bait according to claim 1 wherein the tail has a greater dimension in one direction than the body at the juncture of the body and tail and the width of the tail tapers outwardly from the body in a curved configuration to a point where the width of the tail begins to taper inwardly and the tail begins to curve toward itself, the tail terminating in a pointed end directed toward a wide portion of the tail when the bait is at rest, whereby the tail and the pocket are caused to flutter relative to the body in use.

3. An artificial fish bait according to claim 1 wherein a noise maker is proved for the user to put in the pocket.

4. An artificial fish bait according to claim 1 wherein a light stick is provided for the user to put in the pocket.

5. An artificial fish bait according to claim 2 wherein a noise maker is provided for the user to put in the pocket.

6. An artificial fish bait according to claim 2 wherein a light stick is provided for the user to put in the pocket.

7. An artificial fish bait according to claim 1 wherein two pockets are formed a portion of the thin flat tail adjoining the trailing end of the bulky body.

8. An artificial fish bait according to claim 7 wherein a noise maker and a light stick are provided for the user to put in the pockets.

9. An artificial fish bait according to claim 7 wherein noise makers are provided for the user to put in the pockets.

10. An artificial fish bait according to claim 7 wherein light sticks are provided for the user to put in the pockets.

11. An artificial fish bait according to claim 2 wherein two pockets are formed in a portion of the thin flat tail adjoining the trailing end of the bulky body.

12. An artificial fish bait according to claim 11 wherein a noise maker and a light stick are provided for the user to put in the pockets.

13. An artificial fish bait according to claim 11 wherein noise makers are provided for the user to put in the pockets.

14. An artificial fish bait according to claim 11 wherein light sticks are provided for the user to put in the pockets.

15. An artificial fish bait according to claim 1 wherein the body and the tail are impregnated with a fish attractant taste.

16. An artificial fish bait according to claim 2 wherein the body and the tail are impregnated with a fish attractant taste.

17. An artificial fish bait according to claim 1 wherein the body and the tail are impregnated with a fish attractant scent.

18. An artificial fish bait according to claim 2 wherein the body and the tail are impregnated with a fish attractant scent.

19. An artificial fish bait comprising a soft and bulky body having a leading end and a trailing end and having generally uniform cross-sectional dimensions, the improvement which comprises a thin flat tail extending from the trailing end of the bulky body, the thin flat tail being wider than the body at their juncture and tapering outwardly from the body in a curved configuration to a point where the width of the tail begins to taper inwardly and the tail begins to curve toward itself, the tail terminating in a pointed end directed toward the wide portion of the tail when the bait is at rest, and at least one thin walled pocket to receive fish attractant located at the juncture of the thin flat tail and the trailing end of the bulky body, whereby the thin flat tail flutters in use relative to the bulky body and imparts corresponding motion to the thin walled pocket and the effectiveness of a fish attractant in the pocket is enhanced by the movement of the pocket induced by the fluttering of the tail and by the thinness of the pocket wall which does not inhibit or insulate the fish attractant in the pocket.

* * * * *